United States Patent [19]

Middleton

[11] Patent Number: 4,470,527

[45] Date of Patent: Sep. 11, 1984

[54] COLLAPSIBLE TELESCOPING SHAFT EQUIPPED WIG MOUNT

[76] Inventor: Robert A. Middleton, 500 Renee La., DeSota, Tex. 75115

[21] Appl. No.: 506,311

[22] Filed: Jun. 21, 1983

[51] Int. Cl.³ .............................................. D06C 15/00
[52] U.S. Cl. .................................. 223/066; 248/188.5
[58] Field of Search ................. 248/188.5, 229, 188.4; 223/66, 67

[56] References Cited

U.S. PATENT DOCUMENTS

| 2,128,522 | 8/1938 | Burns et al. | 248/188.5 |
| 3,779,433 | 12/1973 | Imai | 223/66 |
| 3,934,804 | 1/1976 | Bruce | 223/66 |
| 3,987,807 | 10/1976 | Varnell | 248/188.5 |

Primary Examiner—Werner H. Schroeder
Assistant Examiner—J. L. Kravitz
Attorney, Agent, or Firm—Warren H. Kintzinger

[57] ABSTRACT

A wig mount is provided equipped with a collapsible telescoping shaft with a top element bonded in a receiving socket within the wig mount cap. The collapsible telescoping shaft has a top element, an intermediate element, and a bottom element with a screw clamp pivotally attached to the bottom element. The screw clamp that is conveniently used to clamp the bottom of the shaft bottom element to the top of a table, desk or shelf edge is pivotal, when in the unclamped state and the shaft collapsed to a stowed state substantially within the wig mount cap. The shaft elements are generally smooth on the exterior but in one version contain a resiliently compressed spring that urges the shaft to the telescope expanded state when a catch is released that otherwise holds the shaft in the telescoped state. In another version the top element and the intermediate element are each internally threaded, and the intermediate element and the bottom element each have a top flange with external threads threadingly engaging, respectively, the internal threading of the top element and the intermediate element whereby the shaft may be turned to any telescoped length desired between the maximum length state and the fully telescope collapsed state.

15 Claims, 7 Drawing Figures

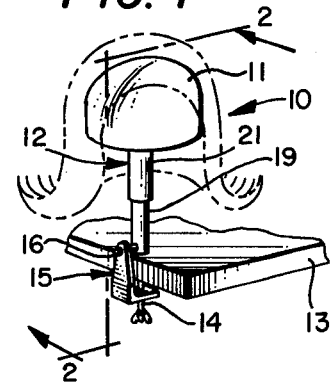
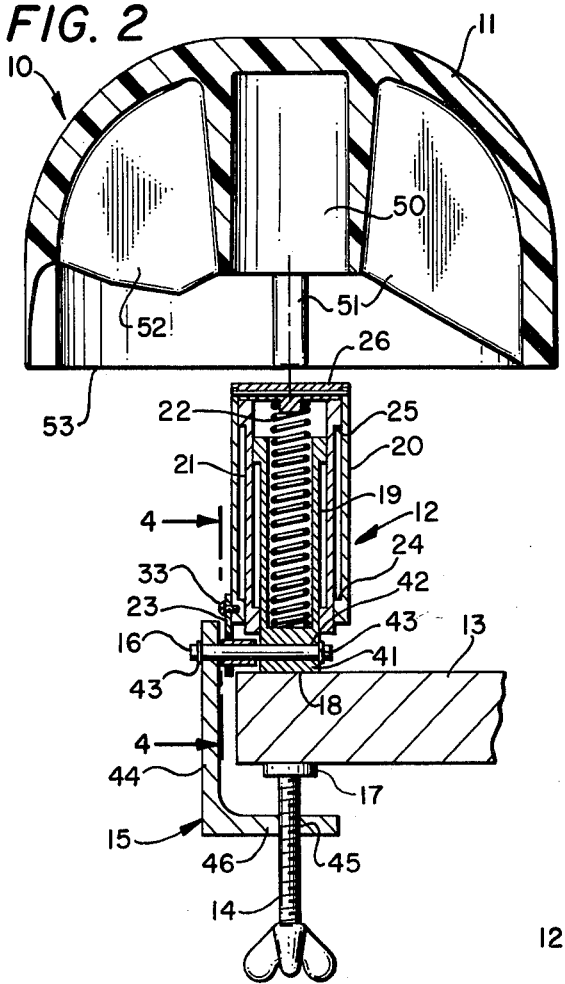
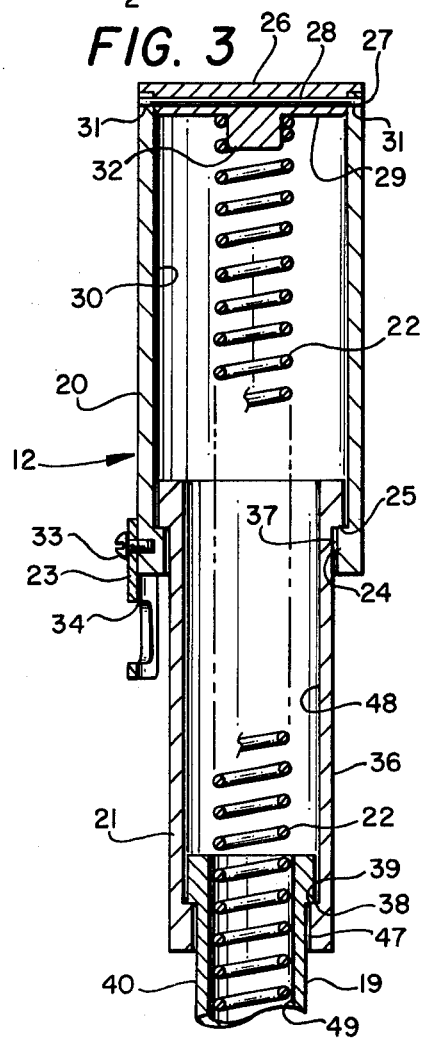
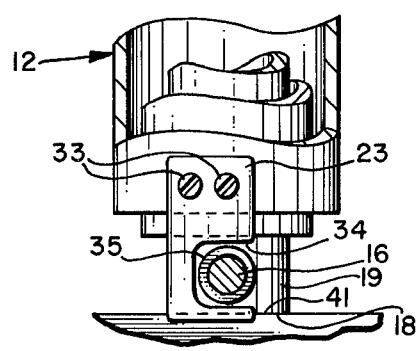

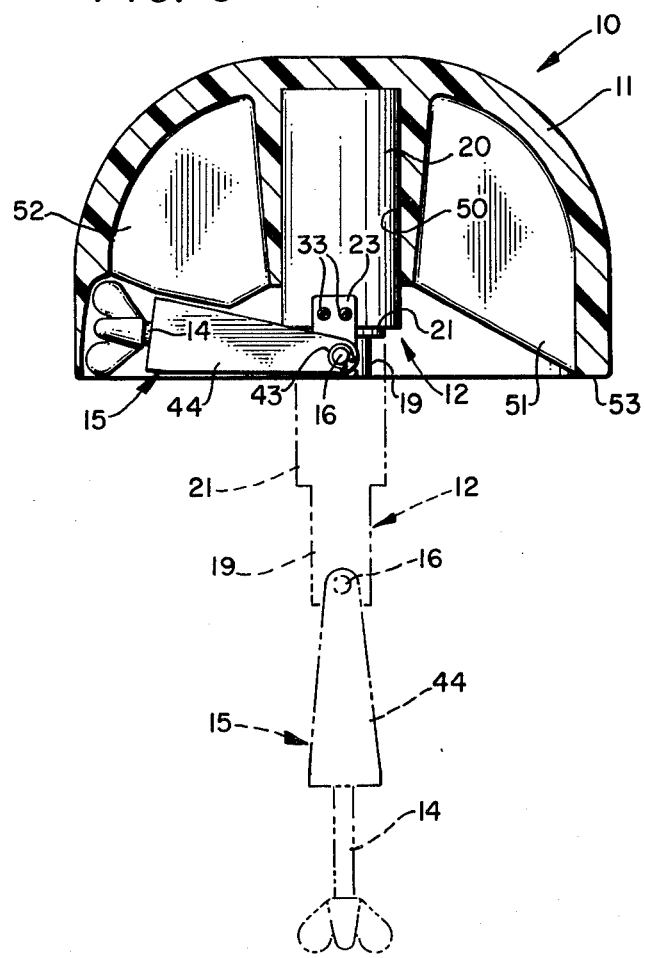

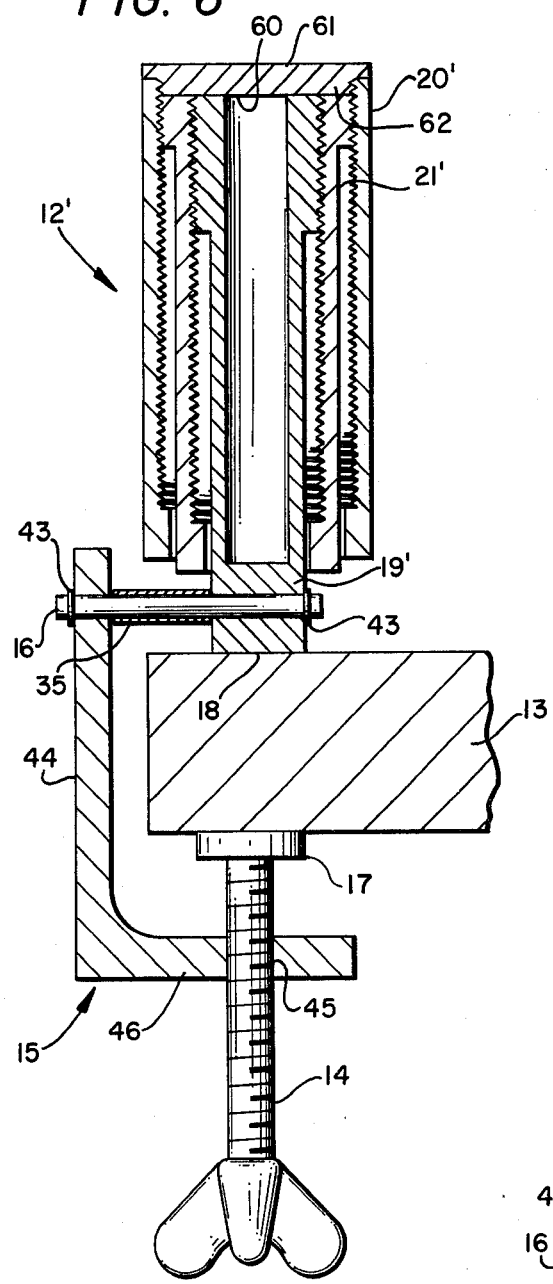
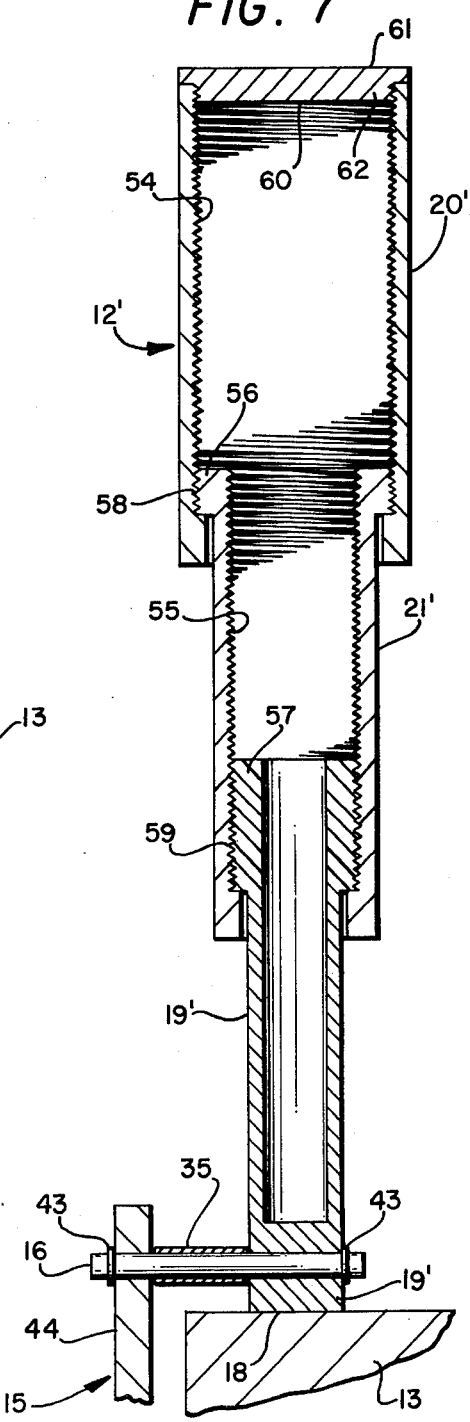

COLLAPSIBLE TELESCOPING SHAFT EQUIPPED WIG MOUNT

This invention relates in general to wig mount structures, and more particularly, to collapsible telescoping shaft equipped wig mounts with a screw clamp pivotally attached to a bottom element of the shaft, pivotal, when in the unclamped state and with the shaft collapsed, to a stowed state substantially within the wig mount cap.

There are many wig mounting structures and devices available to the trade and many more that have been devised in the past. Many of these wig mounts have various features and combinations of features for various reasons including appearance, strength, durability, type of use intended, and expense of production. While many of these have resulted in wig mounts good for the use intended where portability, weight, size and configuration are important considerations, much is lacking. Various wig mounts presently on the market are too heavy, bulky and/or awkward to use particularly where portability is important and also where ease of mounting to an availabe table, desk or shelf edge is desired.

It is, therefore, a principle object of this invention to provide a portable wig mount that is easy to carry.

Another object is to provide such a portable wig mount collapsible to a minimum package size when not mounted and extended for holding a wig.

A further object is to provide such a portable wig mount with a holding clamp readily collapsible to any convenient support edge such as a table edge, desk edge or shelf edge.

Still another object is to provide such a portable wig mount with the clamp pivotally connected to a mounting shaft bottom of a collapsing mounting shaft and pivotal to substantial containment within the wig mount cap in a stowed state.

Features of the invention in accomplishing the above objects include, in a collapsible telescoping shaft equipped wig mount, a collapsible telescoping shaft with the top element thereof bonded in place in a receiving socket within a wig mount cap of light weight material such as styrofoam. In addition to the top element the telescoping shaft has an intermediate element and a bottom element with a screw clamp pivotally attached to the bottom element. The screw clamp to shaft bottom element interconnect is such as to conveniently clamp the bottom element to the edge of a table top, a desk top or a shelf edge, and when in the unclamped state with the shaft completely collapsed, the clamp is pivotal to a stowed state substantially within the wig mount cap. The shaft elements are generally smooth on the exterior but in one version contain a resiliently compressed spring that urges the shaft to the telescope expanded state when a catch is released that otherwise holds the shaft in the telescoped state. In another version the top element and the intermediate element are each internally threaded, and the intermediate element and the bottom element each have a top flange with external threads threadingly engaging, respectively, the internal threading of the top element and the intermediate element whereby the shaft may be turned to any desired telescoped length desired between the maximum length state and the fully telescope collapsed state.

Specific embodiments representing what are presently regarded as the best modes of carrying out the invention are illustrated in the accompanying drawings:

In the drawings:

FIG. 1 represents a perspective view of a wig mount structure in the telescope shaft extended state conveniently clamp mounted on a table, desk, or shelf edge;

FIG. 2, a partially cut away and sectioned view taken generally from line 2—2 of FIG. 1, and with the wig cap lifted up from the top shaft element;

FIG. 3, a partially cut away and sectioned view like that of FIG. 2 showing detail of the telescoping shaft in the expanded state;

FIG. 4, a partial cut away and sectioned view of the telescoped shaft bottom in the compressed collapsed and latched state;

FIG. 5, a partially cut away and sectioned view of the wig mount cap with the telescopable shaft and clamp mount in the collapsed and stowed state within the wig mount cap, and in phantom the alternate shaft extended and clamp depending state for mounting;

FIG. 6, a partially cut away and sectioned view like that of FIG. 2 with, however, the wig cap removed and a threaded telescoping shaft alternate to the resilient spring equipped telescoping shaft of the wig mount embodiment FIGS. 1 through 5; and, FIG. 7, a partially cut away and sectioned view like that of FIG. 6 showing the thread interconnected telescoping shaft in the expanded state.

Referring to the drawings:

The wig mount 10 of FIG. 1 shown to have a wig mount cap 11, that may be made, for example, of light weight material such as styrofoam, that is mounted on the top of a telescoping shaft 12. The shaft 12 in turn is shown to be mounted to the edge of a table top 13 by a screw 14 clamp 15 that is mounted by pivot pin 16 on bottom of telescoping shaft 12. Tightening of screw 14 presses clamp pad 17 against the bottom of the table top 13 that reactively clamps the bottom 18 of the bottom element 19 of telescoping shaft 12 down on the upper upper surface of the table 13.

Referring also to FIGS. 2, 3 and 4 the telescoping shaft 12 is shown to include a top element 20, an intermediate element 21 and the bottom element 19, an internal resiliently compressible coil spring 22 and a telescoping shaft collapsed state holding clasp 23. The telescoping shaft top element 20 is generally cylindrical with a bottom internal annular shoulder 24 that contacts external annular shoulder 25 of cylindrical intermediate element 21 as a stop limit to outermost telescoping travel between the telescoping shaft elements 20 and 21. Top element 20 has a top enclosing end member 26 that is fastened in place thereon by pin 27 that extends through the opening 28 in the body 29 of member 26 extended into the cylindrical opening 30 of top element 20 and through openings 31 in the cylindrical wall of top element 20. The top end member 26 is also provided with an internal spring 22 centering post 32 within top element 20. Further, the telescoping shaft 12 collapsed state holding clasp 23 is fastened to the outer cylindrical bottom of top element 20 with two screws 33 threaded into the internal annular shoulder 24 from the outside of the top element 20. Clasp 23 that is curved to conform to the outer cylindrical surface of top element 20 extends below the element 20 for clasp engagement and disengagement of the clasp opening 34 with pivot pin 16 consistent with appropriate directional rotation of the top element 20 relative to the bottom element 19. A sleeve 35 on pivot pin 16 aids in engaging and disengagement of the clasp 23 with respect to pivot pin 16 since the sleeve 35 rotates on the pin 16.

The telescoping shaft intermediate element 21 has a generally cylindrical body 36 that slides through opening 37 of top element 20 in telescoping movement of the shaft elements and the external annular shoulder 25 slides with telescoping movement within the cylindrical opening 30. Intermediate element 21 also has a bottom internal annular shoulder 38 that contacts external annular shoulder 39 of cylindrical bottom element 19 as a stop limit to outermost telescoping travel between the telescoping shaft elements 21 and 19. The telescoping shaft bottom element 19 has a generally cylindrical body 40 cup shaped with a solid bottom section 41 with the pivot pin 16 extended through opening 42 and locked in place by "C" rings 43 on opposite rod ends. The sleeve 35 also functions as a spacer between the bottom section 41 of bottom element 19 and the upright leg 44 of clamp 15. The clamp screw 14 extends through the threaded opening 45 in clamp base 46 for tightening of screw 14 in clamping action of the clamp 15 on the edge of table 13 (or of a desk or shelf). The cylindrical body 40 of bottom element 19 is slidable through opening 47 of intermediate element 21 with telescoping movement of the shaft elements and the external annular shoulder 39 slides within cylinder opening 48. The cylindrical cup opening 49 of the bottom element 19 is a guiding receptacle for the lower portion and bottom of coil spring 22.

The wig mount cap 11 is provided with a telescoping shaft receiving socket opening 50 at the cap center within which the top element 20 of the shaft 12 is bonded. The cap 11 is also molded with wall like reinforcing ribs approximately one half inch in thickness such as ribs 51 and 52 with rib 52 having a cut away recess to accomodate stowed storage space for the clamp 15 and clamp screw 14 when pivoted thereto as shown in FIG. 5 with the telescoping shaft 12 in the collapsed state so that shaft 12 and clamp 15 structure are substantially entirely stowed within the cap 11 above the profile of the bottom edge 53 thereof.

With the alternate embodiment of FIGS. 6 and 7 another telescoping shaft 12' is provided with the top element 20', intermediate element 21' and bottom element 19' generally smooth on the exposed exteriors thereof as with the spring biased embodiment. With this embodiment, however, the top element 20' and intermediate element 21' are internally threaded 54 and 55, respectively, and the intermediate element 21' and the bottom element 19' each have a top flange 56 and 57, respectively, with external threads 58 and 59 thread engaging internal threading 54 and 55. Thus, the telescoping shaft 12' may be turned to any desired telescoped length between the maximum length state and the fully telescope collapsed state. With this threaded telescoping shaft 12' embodiment the fully collapsed state is, as shown in FIG. 6, with both the intermediate element 21' and the bottom element 19' threaded inwardly to the limit with element 21' in contact with the bottom 60 of closure cap 61 with a threaded body 62 threaded into the threads 54 at the top end of shaft element 20' and element 19' in contact with or closely adjacent the bottom 60 of closure cap 61.

Whereas this invention has been described with respect to several embodiments thereof, it should be relaized that various changes may be made without departure from the essential contributions to the art made by the teachings hereof.

I claim:

1. A collapsible telescoping shaft equipped wig mount comprising: a wig mount cap in the form of an inverted dome-shaped shell generally approximating a head top and shape adapted to support a wig and having an internal socket; said collapsible telescoping shaft having a plurality of telescoping elements including, a top element received in and seated in said internal socket of the wig mount cap, and a bottom element with a clamp structure pivotally attached thereto for clamping of the bottom of said shaft bottom element to the top of a table, desk or shelf edge to thereby conveniently mount the wig mount for use in supporting a wig; wherein said collapsible telescoping shaft includes an intermediate element interconnecting said top element and said bottom element; said clamp structure is pivot pin mounted to the bottom section of said bottom element and includes an "L" shaped clamp body with a clamping screw threaded through a base portion of the clamp body for tightening of the screw against the bottom of a table or desk top or shelf to reactively clamp the bottom of said bottom element down on the upper surface of a table or desk top or shelf; said wig mount cap is moulded with said shape having said socket and with reinforcing ribbing extending between said socket and said dome shaped shell; with ribbing space reduced to provide space enabling, with said telescoping shaft in the collapsed state, containment of the shaft and said clamp structure in a stowed state substantially entirely within said wig mount cap above the profile of the bottom edge thereof; said clamp structure also includes a spacer sleeve rotatable on said clamp pivot pin spacing said "L" shaped clamp body from the bottom section of said bottom element; wherein resiliently compressible spring means is contained within said telescoping shaft urging said top element and said bottom element apart from the collapsed telescoped shaft state to the telescope extended state; and wherein a telescoping shaft collapsed state holding clasp is mounted on said top element and extends below the top element for clasp engagement and disengagement of the clasp with said pivot pin consistent with appropriate directional rotation of said top element relative to said bottom element.

2. The collapsible telescoping shaft equipped wig mount of claim 1, wherein said plurality of telescoping elements are generally smooth on outer exposed exterior surfaces.

3. The collapsible telescoping shaft equipped wig mount of claim 2, wherein said top element is bonded in place in said internal socket within said wig mount cap.

4. The collapsible telescoping shaft equipped wig mount of claim 1, wherein said plurality of elements of said telescoping shaft are generally hollow cylindrical elements; with said top element closed at the top by a top enclosing end member fastened in palce thereon; and with said bottom element a cupped shaped element with a solid base.

5. The collapsible telescoping shaft equipped wig mount of claim 4, wherein an inner spring centering post is provided on the bottom of said top enclosing end member for holding the top of said spring means in alignment; with said spring means in the form of a resiliently compressible coil spring; and with the coil spring guided and restrained within the cup shape of said bottom element.

6. The collapsible telescoping shaft equipped wig mount of claim 5, wherein a bottom internal annular shoulder is provided in said shaft top element; an external annular shoulder is provided on said shaft intermediate element with said shoulders in being brought into contact providing a stop limit to outermost telescoping travel between the top and intermediate telescoping shaft elements.

7. The collapsible telescoping shaft equipped wig mount of claim 6, wherein a bottom internal annular shoulder is provided in said shaft intermediate element; an external annular shoulder is provided on said shaft bottom element with said shoulders brought into contact providing a stop limit to outermost telescoping travel between the intermediate and bottom telescoping shaft elements.

8. A collapsible telescoping shaft equipped wig mount comprising: a wig mount cap in the form of an inverted dome-shaped shell generally approximating a head top and shape adpated to support a wig and having an internal socket; said collapsible telescoping shaft having a plurality of telescoping elements including, a top element received in and seated in said internal socket of the wig mount cap, and a bottom element with a clamp structure pivotally attached thereto for clamping of the bottom of said shaft bottom element to the top of a table, desk or shelf edge to thereby conveniently mount the wig mount for use in supporting a wig; wherein said collapsible telescoping shaft includes an intermediate element interconnecting said top element and said bottom element; said clamp structure is pivot pin mounted to the bottom section of said bottom element and includes an "L" shaped clamp body with a clamping screw threaded through a base portion of the clamp body for tightening of the screw against the bottom of a table or desk top or shelf to reactively clamp the bottom of said bottom element down on the upper surface of a table or desk top or shelf; said wig mount cap is moulded with said shape having said socket and with reinforcing ribbing extending between said socket and said dome shaped shell; with ribbing space reduced to provide space enabling, with said telescoping shaft in the collapsed state, containment of the shaft and said clamp structure in a stowed state substantially entirely within said wig mount cap above the profile of the bottom edge thereof; said clamp structure also includes a spacer sleeve rotatable on said clamp pivot pin spacing said "L" shaped clamp body from the bottom section of said bottom element; wherein said plurality of telescoping shaft elements are threadingly interconnected whereby the shaft may be thread turned to any desired telescoped length desired between the maximum length state and the fully telescope collapsed state; and wherein said top element and said intermediate element are each internally threaded; and said intermediate element and said bottom element each have a top annular flange with external threads threadingly engaging, respectively, the internal threading of said top element and the internal threading of said intermediate element.

9. The collapsible telescoping shaft equipped wig mount of claim 8, wherein said plurality of elements of said telescoping shaft are generally hollow cylindrical elements; with said top element closed at the top by a top enclosing end member fastened in place thereon; and with said bottom element a cupped shaped element with a solid base.

10. The collapsible telescoping shaft equipped wig mount of claim 9, wherein a bottom internal annular shoulder is provided in said shaft top element; an external annular shoulder is provided on said shaft intermediate element with said shoulders in being brought into contact providing a stop limit to outermost telescoping travel between the top and intermediate telescoping shaft elements.

11. The collapsible telescoping shaft equipped wig mount of claim 10, wherein a bottom internal annular shoulder is provided in said shaft intermediate element; an external annular shoulder is provided on said shaft bottom element with said shoulders brought into contact providing a stop limit to outermost telescoping travel between the intermediate and bottom telescoping shaft elements.

12. The collapsible telescoping shaft equipped wig mount of claim 11, wherein said shaft top element is closed at the top by a top enclosing end member fastened in place thereon with threads on the top enclosing end member threaded into internal threading of said top element.

13. The collapsible telescoping shaft equipped wig mount of claim 12, wherein the innermost collapsed limit for said telescoping shaft is with limit contact of said intermediate element and said bottom element with the bottom of said top enclosing end member threaded into internal threading of said top element.

14. The collapsible telescoping shaft equipped wig mount of claim 8, wherein said plurality of telescoping elements are generally smooth on outer exposed exterior surfaces.

15. The collapsible telescoping shaft equipped wig mount of claim 14, wherein said top element is bonded in place in said internal socket within said wig mount cap.

* * * * *